United States Patent [19]

Boyd et al.

[11] 4,119,624

[45] Oct. 10, 1978

[54] DISPERSE MONOAZO DYESTUFFS

[75] Inventors: Violet Boyd; Brian Ribbons Fishwick; David John Watson, all of Manchester, England

[73] Assignee: Imperial Chemical Industries Limited, London, England

[21] Appl. No.: 567,404

[22] Filed: Apr. 11, 1975

Related U.S. Application Data

[63] Continuation of Ser. No. 363,319, May 24, 1973, abandoned.

[30] Foreign Application Priority Data

Jun. 8, 1972 [GB] United Kingdom ............... 26808/72

[51] Int. Cl.² ............................................. C09B 29/08
[52] U.S. Cl. .............................. 260/207.1; 260/465 D
[58] Field of Search .............................. 260/207, 207.1

[56] References Cited

U.S. PATENT DOCUMENTS

| | | | |
|---|---|---|---|
| 3,097,198 | 7/1963 | Fishwick et al. | 260/207.1 |
| 3,335,126 | 8/1967 | Baron et al. | 260/207.1 |
| 3,342,804 | 9/1967 | Mueller | 260/207.1 |
| 3,359,256 | 12/1967 | Mueller et al. | 260/207.1 X |
| 3,398,135 | 8/1968 | Mueller | 260/207.1 X |
| 3,406,164 | 10/1968 | Altermatt et al. | 260/207 |
| 3,445,454 | 5/1969 | Fishwick et al. | 260/207 X |
| 3,522,235 | 7/1970 | Baron et al. | 260/207 |
| 3,544,550 | 12/1970 | Anderton et al. | 260/207.1 |
| 3,592,807 | 7/1971 | von Brachel et al. | 260/207.1 |
| 3,637,651 | 1/1972 | Baron et al. | 260/207 |

FOREIGN PATENT DOCUMENTS 1,114,603  5/1968  United Kingdom ................... 260/207.1

Primary Examiner—Charles F. Warren
Attorney, Agent, or Firm—Cushman, Darby & Cushman

[57] ABSTRACT

The disperse monoazo dyestuffs of the formula:-

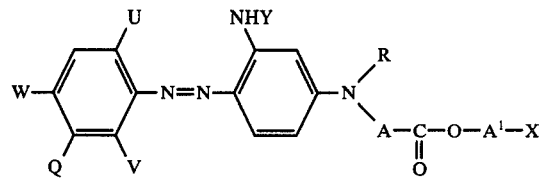

wherein U is hydrogen, chlorine, bromine, cyano, lower alkyl, lower alkoxy or a group of the formula —CONT¹T², —COOT³ or —SO₂T³;

V is hydrogen, chlorine, bromine, cyano or lower alkoxycarbonyl;

W is hydrogen, cyano, nitro, thiocyano, chlorine, bromine or a group of the formula —SO₂NT¹T², —COOT³ or —SO₂T³;

Q is hydrogen, chlorine, bromine, lower alkoxy or a —COOT³ group;

R is cyano lower alkyl;

A and A¹ each independently represent a lower alkylene radical;

X is cyano, lower alkoxy, lower alkoxy lower alkoxy, lower alkoxy lower alkoxy lower alkoxy, chlorine, bromine, lower alkoxycarbonyl, lower alkylcarbonyl, optionally substituted phenoxy carbonyl or optionally substituted phenoxy;

Y is lower alkoxycarbonyl, lower alkylcarbonyl, optionally substituted phenylcarbonyl, optionally substituted phenoxycarbonyl, phenyl lower alkoxycarbonyl, lower alkylsulphonyl, optionally substituted phenylsulphonyl or N-optionally substituted aminocarbonyl;

T¹ is hydrogen or alkyl;

T² is hydrogen, alkyl, phenyl, phenylalkyl or cycloalkyl; and T³ is alkyl, phenyl, phenylalkyl or cycloalkyl, a process for the manufacture of the said dyestuffs and their use for coloring synthetic textile materials. The said dyestuffs have excellent build-up properties on polyester textile material so that heavy depths of shade can be readily obtained and the resulting colorations have excellent fastness to light, to wet treatments and to dry heat treatments.

3 Claims, No Drawings

DISPERSE MONOAZO DYESTUFFS

This is a continuation of application Ser. No. 363,319 filed May 24, 1973, now abandoned.

This invention relates to disperse monoazo dyestuffs which are valuable for coloring synthetic textile materials, in particular polyester textile materials.

In British Specification No. 909,843 there are described and claimed the water-insoluble azo dyestuffs of the formula

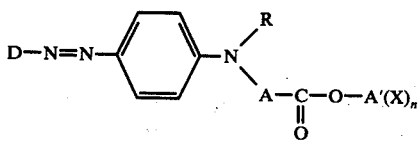

wherein D represents a mono- or bi-cyclic aromatic nucleus, R stands for a lower alkyl or aralkyl group, either of which may carry substituents other than sulphonic acid and carboxylic acid radicals, or for the group

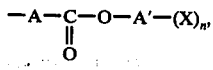

A represents a —CH$_2$— or —CH$_2$CH$_2$— group, A' represents a saturated di- or tri-valent aliphatic radical of from 1 to 4 carbon atoms, X represents a cyano, lower alkoxy, carbo(lower alkoxy), carbonamido, acyl, acyloxy, acylamino, amino, alkylamino, dialkylamino, or monocyclic aryl radical, n is 1 or 2, and the nuclei D and E may carry substituents other than sulphonic and carboxylic acid radicals.

Although the Specification discloses that such dyestuffs are valuable for coloring polyester textile materials it has now been found that a particularly valuable class of dyestuffs are those wherein the coupling component additionally contains an acylamino group as such dyestuffs give dyeings of even higher fastness to dry heat treatments.

According to the invention there are provided the disperse monoazo dyestuffs of the formula:

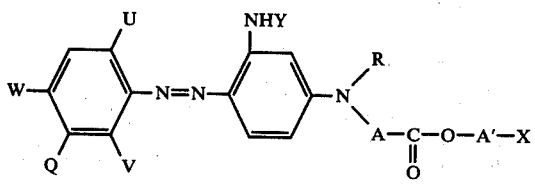

wherein U is hydrogen, chlorine, bromine, cyano, lower alkyl, lower alkoxy or a group of the formula —CONT$^1$T$^2$, —COOT$^3$ or —SO$_2$T$^3$;

V is hydrogen, chlorine, bromine, cyano or lower alkoxycarbonyl;

W is hydrogen, cyano, nitro, thiocyano, chlorine, bromine or a group of the formula —SO$_2$NT$^1$T$^2$, —COOT$^3$ or —SO$_2$T$^3$;

Q is hydrogen, chlorine, bromine, lower alkoxy or a —COOT$^3$ group;

R is cyano lower alkyl;

A and A$^1$ each independently represent a lower alkylene radical;

X is cyano, lower alkoxy, lower alkoxy lower alkoxy, lower alkoxy lower alkoxy lower alkoxy, chlorine, bromine, lower alkoxycarbonyl, lower alkylcarbonyl, optionally substituted phenoxy carbonyl or optionally substituted phenoxy;

Y is lower alkoxycarbonyl, lower alkylcarbonyl, optionally substituted phenylcarbonyl, optionally substituted phenoxycarbonyl, phenyl lower alkoxycarbonyl, lower alkylsulphonyl, optionally substituted phenylsulphonyl or N-optionally substituted aminocarbonyl;

T$^1$ is hydrogen or alkyl;

T$^2$ is hydrogen, alkyl, phenyl, phenylalkyl or cycloalkyl; and T$^3$ is alkyl, phenyl, phenylalkyl or cycloalkyl.

It is preferred that Q is hydrogen; and also that Y is lower alkylcarbonyl.

Throughout this Specification the terms "lower alkyl" "lower alkoxy" and "lower alkylene" are used to denote alkyl, alkoxy and alkylene radicals respectively containing from 1 to 4 carbon atoms.

As examples of the lower alkylene radicals represented by A and A$^1$ there may be mentioned methylene, trimethylene, tetramethylene, propylene and, above all, ethylene.

As examples of the cyano lower alkyl radicals represented by R there may be mentioned cyano methyl, γ-cyanopropyl, δ-cyanobutyl and, above all, β-cyanoethyl.

As examples of the lower alkyl radicals represented by U there may be mentioned methyl and ethyl. As examples of the lower alkoxy groups represented by U, Q and X there may be mentioned methoxy, ethoxy, propoxy and butoxy. As examples of the lower alkoxycarbonyl groups represented by V, X and Y there may be mentioned methoxycarbonyl, ethoxycarbonyl and butoxycarbonyl. As examples of the lower alkoxy lower alkoxy radicals represented by X there may be mentioned β-(methoxy or ethoxy)ethoxy and γ-methoxypropoxy, and as an example of the lower alkoxy lower alkoxy lower alkoxy radicals represented by X there may be mentioned β-(β'-ethoxyethoxy)ethoxy. As examples of the optionally substituted phenoxycarbonyl radicals represented by X and Y there may be mentioned phenoxycarbonyl itself and chlorophenoxycarbonyl, bromophenoxycarbonyl and nitrophenoxycarbonyl. As an example of the lower alkylcarbonyl radicals represented by X there may be mentioned acetyl. As examples of the optionally substituted phenoxy radicals represented by X there may be mentioned phenoxy itself and tolyloxy, anisyloxy, chlorophenoxy and bromophenoxy. As examples of the lower alkyl carbonyl radicals represented by Y there may be mentioned propionyl, butyryl and, above all, acetyl. As examples of the optionally substituted phenylcarbonyl radicals represented by Y there may be mentioned benzoyl, nitrobenzoyl and chlorobenzoyl. As examples of the phenyl lower alkoxycarbonyl radicals represented by Y there may be mentioned benzyloxycarbonyl and β-phenylethoxycarbonyl. As examples of the lower alkyl sulphonyl and optionally substituted phenylsulphonyl radicals represented by Y there may be mentioned methylsulphonyl, ethyl-sulphonyl, phenylsulphonyl, p-tolylsulphonyl, m-nitrobenzenesulphonyl and o-chlorobenzenesulphonyl. The N-substituted aminocarbonyl radicals represented by Y are preferably N-lower alkyl and N:N-dilower alkyl aminocarbonyl radicals such as N-methylaminocarbonyl and N:N-diethylaminocarbonyl.

The alkyl radicals represented by $T^1$, $T^2$ and $T^3$ are preferably lower alkyl radicals such as methyl and ethyl. The cycloalkyl radicals represented by $T^2$ and $T^3$ are preferably the cyclohexyl radical. The phenylalkyl radicals represented by $T^2$ and $T^3$ are preferably phenyl lower alkyl radicals such as benzyl and β-phenylethyl.

As examples of the —$CONT^1T^2$ groups represented by U there may be mentioned carbamoyl, N-methylcarbamoyl, N:N-diethylcarbamoyl and N-phenylcarbamoyl. As examples of the —$SO_2NT^1T^2$ groups represented by W there may be mentioned sulphamoyl, N-ethylsulphamoyl, N-phenylsulphamoyl and N:N-dimethylsulphamoyl. The —$SO_2T^3$ groups represented by U and W are preferably lower alkylsulphonyl groups such as methylsulphonyl and ethylsulphonyl. The —$COOT^3$ groups represented by U and W are preferably lower alkoxycarbonyl groups such as methoxycarbonyl and ethoxycarbonyl.

According to a further feature of the invention there is provided a process for the manufacture of the dyestuffs of the invention which comprises diazotizing an amine of the formula:

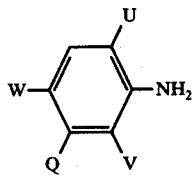

and coupling the resulting diazo compound with a coupling component of the formula:

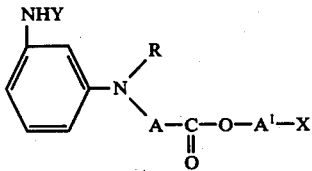

wherein Q, W, U, V, A, $A^1$, R, X and Y have the meanings stated, the amine and coupling component being free from carboxylic and sulphonic acid groups.

The process of the invention can be conveniently carried out by adding sodium nitrite to a solution or suspension of the amine in an aqueous solution of a strong inorganic acid or by stirring the amine in nitrosylsulphuric acid, and adding the resulting solution or suspension of the diazo compound to a solution of the coupling component in water containing an acid and/or a water-immiscible organic liquid, if necessary adjusting the pH of the mixture to facilitate coupling and thereafter isolating the dyestuff which is formed by conventional methods.

As examples of the said amines there may be mentioned 2-(chloro-, bromo-, methylsulphonyl-, cyano-, methoxy- or methoxycarbonyl-)-4-nitroaniline, 2:6-di(-chloro-, bromo-, cyano- or methoxycarbonyl-)-4-nitroaniline, 2-(chloro- or bromo-)-4-nitro-6-cyanoaniline, 2-methoxy-4-nitro-6-chloroaniline and 4-(cyano-, chloro-, methoxy-, methoxycarbonyl-, carbamoyl- or thiocyano-)-2- or 3-(chloro-, bromo-, methoxy- or methoxycarbonyl)- aniline.

As examples of the said coupling components there may be mentioned 3-(acetylamino, propionylamino- or methylsulphonylamino) -N-(β-cyanoethyl)-N-(β-methoxycarbonylethyl) aniline 3-acetylamino-N-(β-cyanoethyl)-N-[β-(β'-cyanoethoxycarbonyl)ethyl] aniline and 3-acetylamino-N-(β-cyanoethyl)-N-[β-(β'-phenoxy-ethoxycarbonyl)ethyl] aniline.

The said coupling components can themselves be obtained by reacting the appropriate monoacylated m-phenylenediamine with acrylonitrile or a chloroalkylnitrile to give a 3-acylamino-N-(cyano lower alkyl-)aniline which is then reacted with acrylic acid or a chloro lower alkyl carboxylic acid and the resulting 3-acylamino-N-(cyano lower alkyl)N-carboxyalkyl aniline esterified with an alcohol of the formula X — A' — OH either directly or by trans-esterification of the corresponding methyl ester.

One preferred class of the dyestuffs of the invention comprises the dyestuffs of the formula:

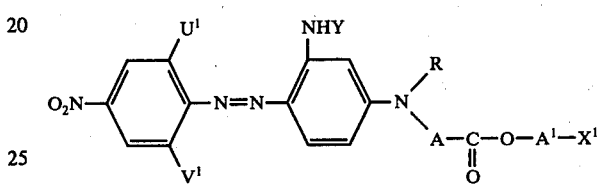

wherein $U^1$ is chlorine, bromine, cyano, lower alkoxy or lower alkoxy carbonyl; $V^1$ is hydrogen, chlorine, bromine, cyano, or lower alkoxy carbonyl; R is cyano lower alkyl; A and $A^1$ are each independently a lower alkylene radical; $X^1$ is cyano, lower alkoxy or optionally substituted phenoxy; and Y is lower alkoxycarbonyl, lower alkylcarbonyl, optionally substituted phenylcarbonyl, lower alkylsulphonyl or optionally substituted phenyl sulphonyl.

A second preferred class of the dyestuffs of the invention comprises the dyestuffs of the formula:

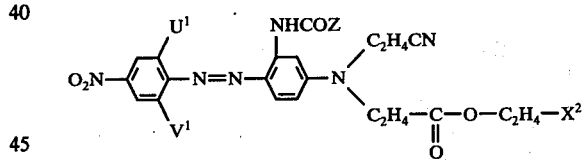

wherein $U^1$ and $V^1$ have the meanings stated, Z is lower alkyl (preferably methyl or ethyl) and $X^2$ is cyano or lower alkoxy.

The disperse monoazo dyestuffs of the invention are valuable for coloring synthetic textile materials, especially aromatic polyester textile materials, which can be in the form of fibres or filaments or woven or knitted goods.

The said dyestuffs can be applied by dyeing, padding or printing processes using the methods which can conventionally be employed for coloring synthetic textile materials by such processes. Thus, for example, a polyester textile material can be immersed in a dyebath comprising an aqueous dispersion of one or more of the said dyestuffs and dyeing then carried out at a temperature in the region of 100° C in the presence of a carrier or at higher temperatures (120° to 140° C) under superatmospheric pressure when a carrier is not required. At the conclusion of the process the dyed polyester textile material is rinsed in water or in an aqueous solution of soap or a synthetic detergent or preferably given a clearing treatment in an aqueous alkaline solution of sodium hydrosulphite, rinsed again in water.

The dyestuffs of the invention have excellent build-up properties on polyester textile materials so that heavy depths of shade can be readily obtained and the resulting colorations have excellent fastness to light, to wet treatments and to dry heat treatments, and in this latter respect are superior to dyeings obtained on polyester textile materials from the corresponding dyestuffs which do not contain a -NHY group.

The dyestuffs of the invention are also valuable for coloring synthetic textile materials, particularly aromatic polyester textile materials, by mass coloration of the preferred synthetic polymer followed by spinning into fibres, or by the process of transfer color printing particularly at reduced pressures.

The invention is illustrated but not limited by the following examples in which the parts and percentages are by weight:

EXAMPLE 1

4.5 Parts of a 10N aqueous solution of hydrochloric acid are added to a solution of 1.72 parts of 2-chloro-4-nitroaniline in 20 parts of acetic acid. The mixture is cooled to 10° C, a solution of 0.7 part of sodium nitrite in 7.5 parts of water is added, and the mixture stirred at 5° to 10° C for 15 minutes. 20 Parts of water are added and any excess nitrous acid is then destroyed by addition of sulphamic acid. The resulting solution is then added to a solution of 3.33 parts of 3-acetylamino-N-($\beta$-cyanoethyl)-N-[$\beta$-($\beta'$-methoxyethoxycarbonyl)ethyl]aniline in a mixture of 50 parts of water, 3 parts of a 10N aqueous solution of hydrochloric acid and 50 parts of acetone. Sodium acetate is then added until the mixture is no longer acid to Congo Red, and the mixture is stirred for 4 hours. The dyestuff which is precipitated is then filtered off, washed with water and dried.

When dispersed in an aqueous medium the dyestuff dyes polyethyleneterephthalate textile materials in red shades having excellent fastness to light and to dry heat treatments.

EXAMPLE 2

In place of the 1.73 parts of 2-chloro-4-nitroaniline used in Example 1 there are used 1.68 parts of 2-methoxy-4-nitroaniline whereby a dyestuff is obtained which also gives red shades of excellent heat and light fastness properties when applied to a polyethyleneterephthalate textile material.

The following Table gives further Examples of the dyestuffs of the invention of the formula:

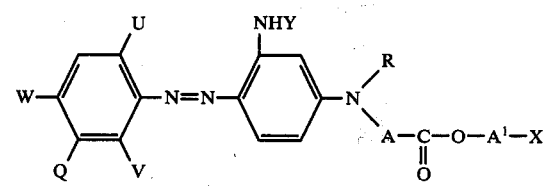

the symbols of which have the values given in the respective columns of the Table. The last column of the Table gives the shades obtained when the dyestuffs are applied to an aromatic polyester textile material.

The dyestuffs of these Examples were obtained by diazotizing the appropriate amine of the formula:

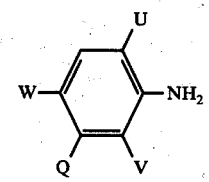

and coupling with the appropriate coupling component of the formula:

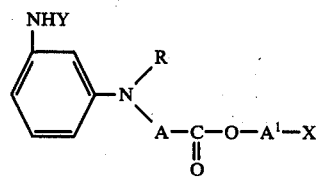

| EX. | V | U | W | Q | Y | R | A | A$^1$ | X | SHADE |
|---|---|---|---|---|---|---|---|---|---|---|
| 3 | hydrogen | hydrogen | nitro | hydrogen | acetyl | $\beta$-cyanoethyl | ethylene | methylene | cyano | Scarlet |
| 4 | " | chlorine | " | " | " | " | " | " | " | Red |
| 5 | " | hydrogen | " | chlorine | " | " | " | " | " | " |
| 6 | chlorine | bromine | " | hydrogen | " | " | " | ethylene | methoxy | " |
| 7 | hydrogen | chlorine | cyano | " | " | " | " | " | " | Orange |
| 8 | " | methoxycarbonyl | nitro | methoxycarbonyl | " | " | " | " | " | Red |
| 9 | " | cyano | " | hydrogen | methoxycarbonyl | " | " | " | $\beta$-methoxyethoxy | Rubine |
| 10 | " | methoxy | " | " | " | " | " | " | " | Red |
| 11 | " | methoxycarbonyl | " | " | " | " | " | " | " | " |
| 12 | chlorine | chlorine | " | " | benzoyl | $\gamma$-cyanopropyl | " | " | " | " |
| 13 | hydrogen | hydrogen | " | chlorine | " | " | " | " | " | " |
| 14 | chlorine | chlorine | chlorine | hydrogen | " | " | " | " | " | Orange |
| 15 | hydrogen | methyl | nitro | " | $\beta$-chloropropionyl | $\beta$-cyanoethyl | trimethylene | " | n-butoxy | Scarlet |
| 16 | " | hydrogen | " | " | " | " | " | " | " | " |
| 17 | " | methoxy | " | " | propionyl | " | ethylene | trimethylene | methoxy | Red |
| 18 | " | chlorine | methylsulphonyl | " | " | " | " | " | " | Orange |
| 19 | " | " | nitro | " | methylsulphonyl | " | trimethylene | methylene | cyano | Red |
| 20 | " | methoxy | " | " | " | " | " | " | " | " |
| 21 | " | methoxy- | " | " | " | " | " | " | " | " |

-continued

| EX. | V | U | W | Q | Y | R | A | A¹ | X | SHADE |
|---|---|---|---|---|---|---|---|---|---|---|
| 22 | " | carbonyl chlorine | hydrogen | chlorine | benzene-sulphonyl | " | β-methyl-ethylene | " | methoxy | Yellow |
| 23 | " | " | nitro | hydrogen | amino-carbonyl | " | " | " | " | Bluish-red |
| 24 | " | hydrogen | " | " | acetyl | γ-cyano-propyl | ethylene | trimethyl-ene | phenoxy | Scarlet |
| 25 | " | chlorine | thiocyano | chlorine | " | " | " | " | " | Orange |
| 26 | " | hydrogen | N-butyl-sulphamoyl | hydrogen | " | " | " | " | " | " |
| 27 | " | carbamoyl | nitro | " | propionyl | β-cyano-ethyl | " | ethylene | bromine | Bluish-red |
| 28 | " | hydrogen | " | " | acetyl | " | " | " | chlorine | Scarlet |
| 29 | " | N-ethyl-carbamoyl | " | " | " | " | " | " | " | Bluish-red |
| 30 | " | bromine | " | " | " | " | " | " | methoxy-carbonyl | Red |
| 31 | " | N:N-di-ethyl carbamoyl | " | " | " | " | " | " | methoxy-carbonyl | Bluish-red |
| 32 | " | " | " | " | " | " | " | tetra-methylene | methoxy | " |
| 33 | " | hydrogen | cyano | " | " | δ-cyano-butyl | " | " | " | Orange |
| 34 | " | " | methoxy-carbonyl | methoxy-carbonyl | " | " | ethylene | " | " | " |
| 35 | " | " | nitro | chlorine | " | β-cyano-ethyl | trimethyl-ene | " | phenoxy-carbonyl | Red |
| 36 | bromine | chlorine | " | hydrogen | " | " | " | " | " | " |
| 37 | hydrogen | " | N:N-di-ethyl-sulphamoyl | " | " | β-cyano-propyl | ethylene | methylene | benzoyl | Orange |
| 38 | chlorine | methoxy-carbonyl | nitro | methoxy-carbonyl | butyryl | β-cyano-ethyl | " | " | acetyl | Red |
| 39 | hydrogen | methoxy | hydrogen | methoxy | " | " | " | " | " | Yellow |
| 40 | " | hydrogen | bromine | bromine | acetyl | " | " | ethylene | ethoxy | Reddish-yellow |
| 41 | " | methyl-sulphonyl | nitro | hydrogen | " | " | " | " | " | Bluish-red |
| 42 | " | p-toluene-sulphonyl | " | " | " | " | " | " | β-(β'-methoxy ethoxy)ethoxy | " |
| 43 | " | benzyloxy carbonyl | " | " | " | " | " | " | cyano | Red |
| 44 | chlorine | chlorine | N-ethyl-N-phenyl-sulphamoyl | " | " | " | " | " | methoxy | Orange |
| 45 | " | " | N-β-phenyl ethyl-sulphamoyl | " | " | " | " | " | " | " |
| 46 | " | " | N-hexyl sulphamoyl | hydrogen | " | " | " | " | " | " |
| 47 | hydrogen | N-o-nitro-phenyl carbamoyl | nitro | " | " | " | " | " | " | Bluish-red |
| 48 | " | N-2:5-dichloro-phenyl carbamoyl | " | " | " | " | " | " | " | " |
| 49 | " | chlorine | " | chlorine | butylamino-carbonyl | " | " | " | " | " |
| 50 | " | " | " | hydrogen | benzyloxy-carbonyl | " | " | " | " | " |
| 51 | cyano | " | " | " | acetyl | " | " | " | " | Violet |
| 52 | methoxy-carbonyl | " | " | " | " | " | " | " | " | Bluish-red |

We claim:

1. A disperse monoazo dyestuff, free from carboxylic acid and sulphonic acid groups, which is of the formula:

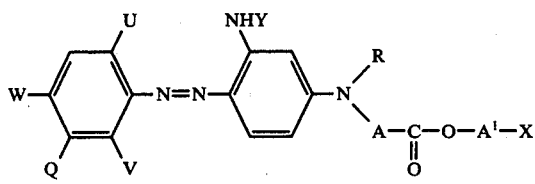

wherein U is selected from hydrogen, chlorine, bromine, cyano, lower alkyl, lower alkoxy, lower alkoxycarbonyl, lower alkylsulphonyl and —CONT¹T² wherein $T^1$ is selected from hydrogen and lower alkyl and $T^2$ from hydrogen, lower alkyl and phenyl;

V is selected from hydrogen, chlorine, bromine, cyano and lower alkoxycarbonyl;

Q is selected from hydrogen, chlorine, bromine, lower alkoxy and lower alkoxycarbonyl;

W is selected from hydrogen, nitro, chlorine, bromine, cyano, thiocyano, lower alkylsulphonyl, lower alkoxycarbonyl or —SO₂NT¹T² wherein $T^1$ is selected from hydrogen and lower alkyl, and $T^2$ from hydrogen, lower alkyl and phenyl;

R is cyano lower alkyl;

A and A¹ are each independently lower alkylene;

Y is selected from loweralkylcarbonyl, lower alkoxycarbonyl, benzoyl, lower alkylsulphonyl, penzenesulphonyl, aminocarbonyl and N-lower alkylaminocarbonyl; and X is selected from lower alkoxy, lower alkoxy lower alkoxy, lower alkoxy lower alkoxy lower alkoxy, cyano, phenoxy, chlorine, bromine, lower alkoxycarbonyl, phenoxycarbonyl, benzoyl and lower alkylcarbonyl.

2. A disperse monoazo dyestuff as claimed in claim 1 which is of the formula:

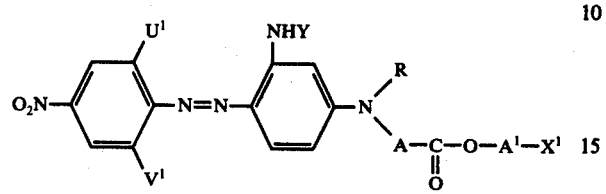

wherein $U^1$ is selected from chlorine, bromine, cyano, lower alkoxy and lower alkoxycarbonyl;

$V^1$ is selected from hydrogen, chlorine, bromine, cyano and lower alkoxycarbonyl;

R is cyano lower alkyl;

A and $A^1$ are each independently a lower alkylene radical;

$X^1$ is selected from cyano, lower alkoxy and phenoxy; and Y is selected from lower alkoxycarbonyl, lower alkylcarbonyl, lower alkylsulphonyl, benzoyl and benzenesulphonyl.

3. A disperse azo dyestuff as claimed in claim 1 which is of the formula:

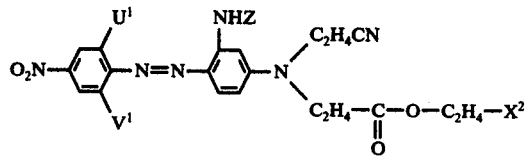

wherein $U^1$ is selected from chlorine, bromine, cyano, lower alkoxy and lower alkoxycarbonyl.

$V^1$ is selected from hydrogen, chlorine, bromine, cyano and lower alkoxycarbonyl;

Z is lower alkyl; and $X^2$ is selected from cyano and lower alkoxy.

* * * * *